Aug. 6, 1935. M. W. KENNEY ET AL 2,010,547
MEANS FOR SEPARATING SOLUTION COMPONENTS IN REFRIGERATING SYSTEMS
Filed July 19, 1933 4 Sheets-Sheet 1
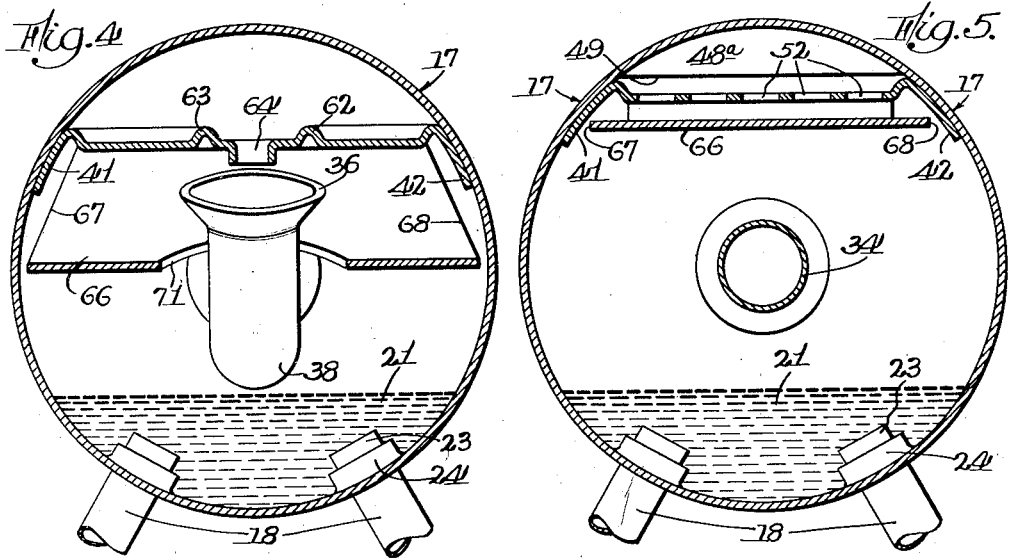
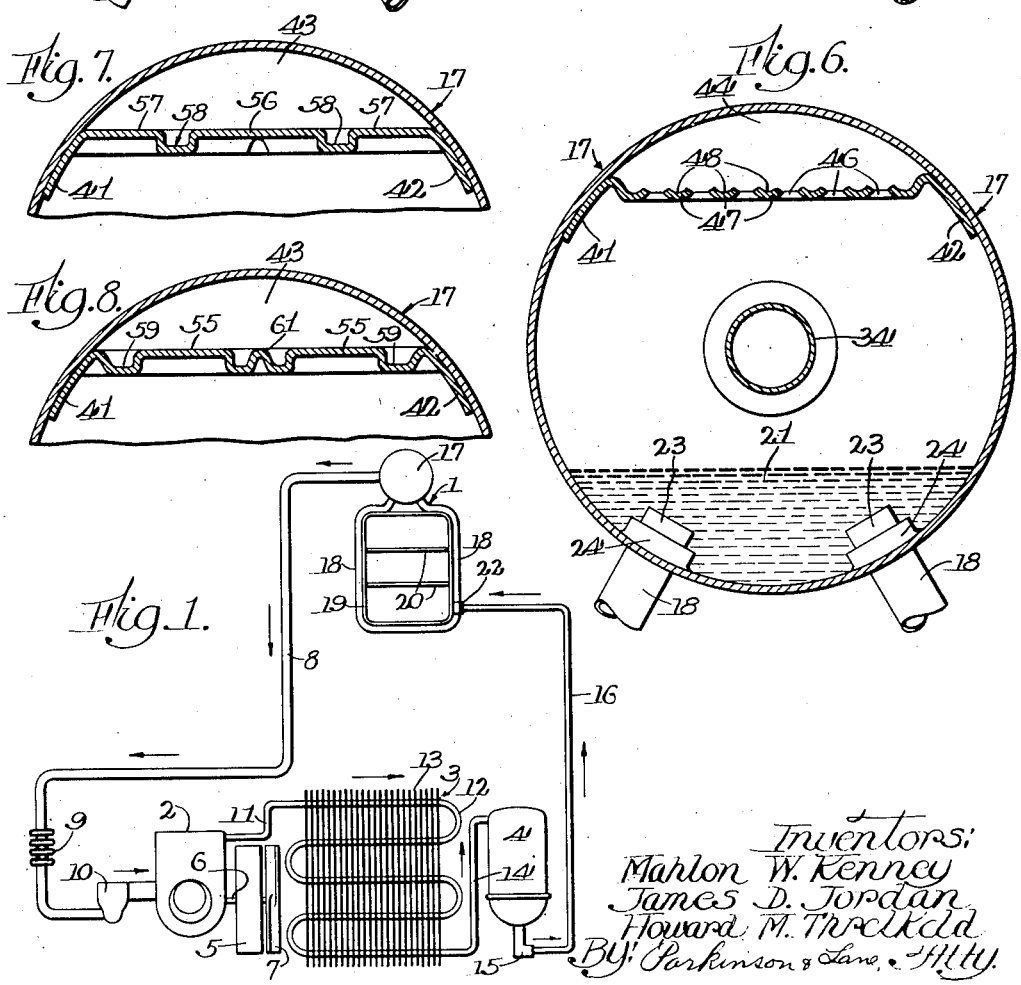

Aug. 6, 1935.   M. W. KENNEY ET AL   2,010,547
MEANS FOR SEPARATING SOLUTION COMPONENTS IN REFRIGERATING SYSTEMS
Filed July 19, 1933   4 Sheets-Sheet 2
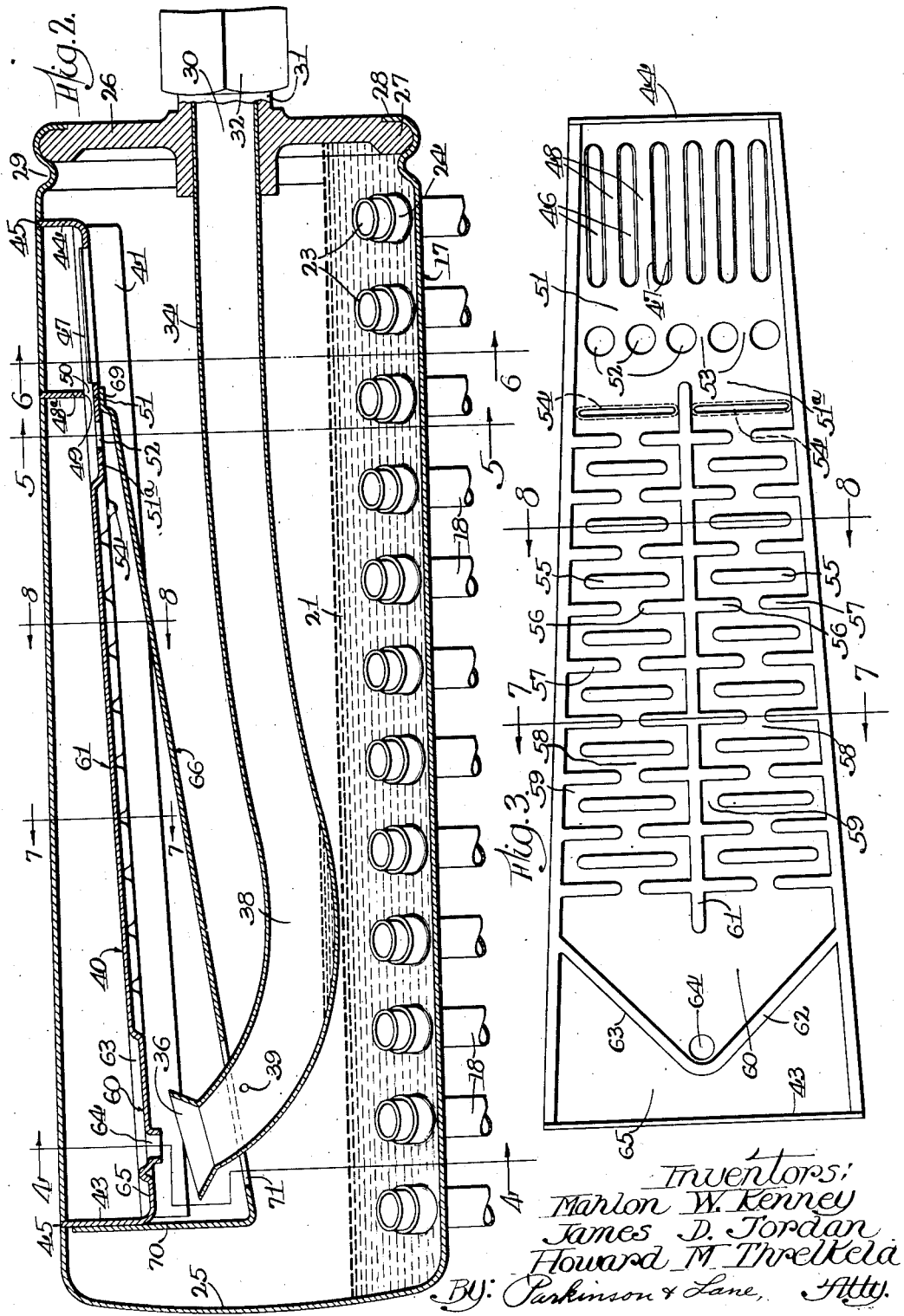
Inventors:
Mahlon W. Kenney
James D. Jordan
Howard M. Threlkeld
By: Parkinson & Lane, Atty.

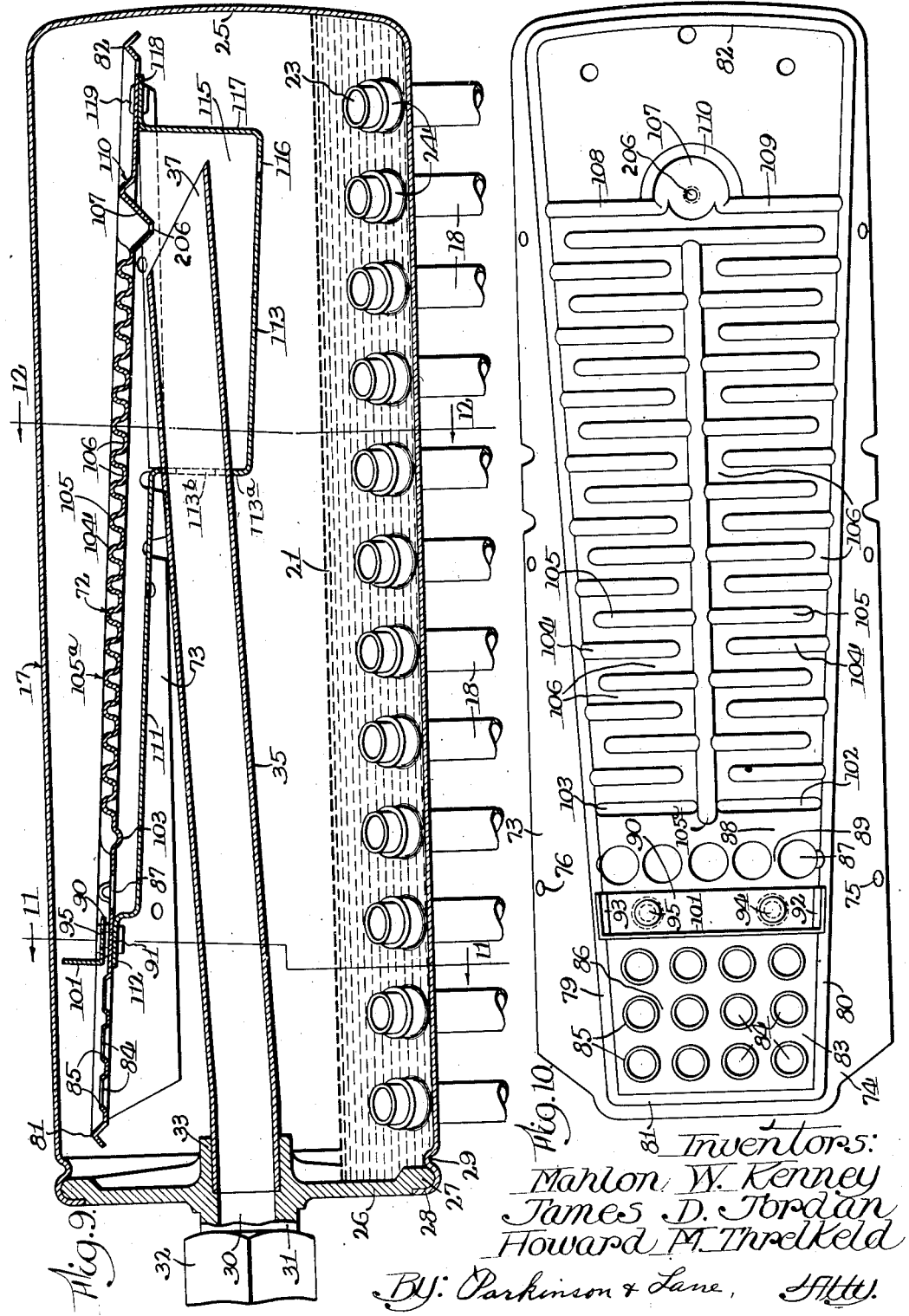

Aug. 6, 1935.  M. W. KENNEY ET AL  2,010,547
MEANS FOR SEPARATING SOLUTION COMPONENTS IN REFRIGERATING SYSTEMS
Filed July 19, 1933  4 Sheets-Sheet 4
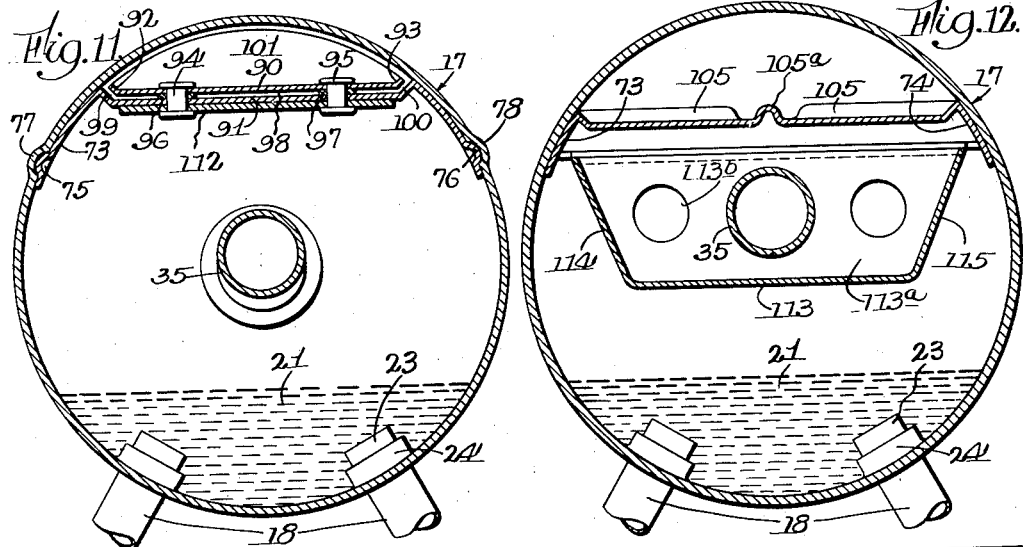
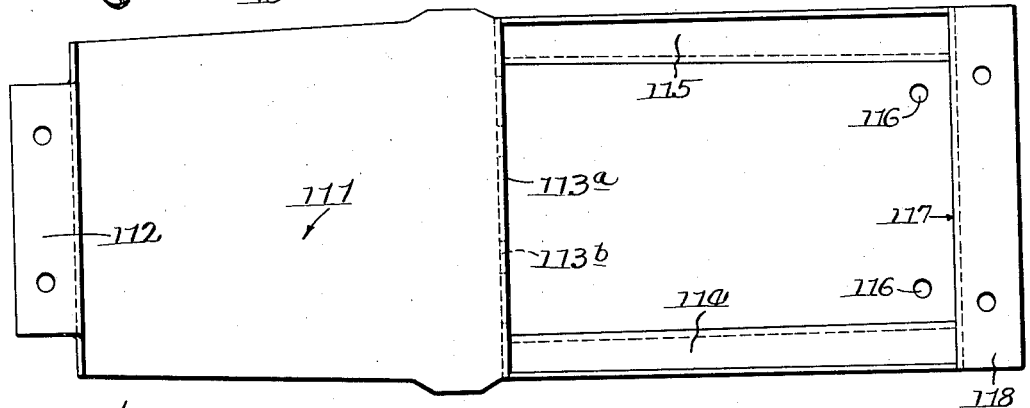
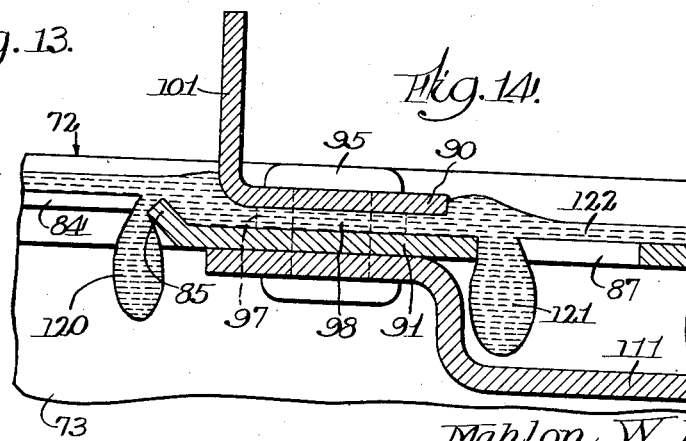

UNITED STATES PATENT OFFICE 2,010,547

MEANS FOR SEPARATING SOLUTION COMPONENTS IN REFRIGERATING SYSTEMS

Mahlon W. Kenney, Berwyn, and James D. Jordan, Elmhurst, Ill., and Howard M. Threlkeld, Phoenix, Ariz., assignors, by mesne assignments, to General Household Utilities Company, Chicago, Ill., a corporation of Delaware Application July 19, 1933, Serial No. 681,098

15 Claims. (Cl. 62—126)

The present invention relates to separating means in refrigerating systems, and method of separating components of a liquid solution, and more particularly to the separation of oil from the liquid refrigerant used in a refrigerating system.

Among the objects of the invention, is to provide a novel means for and a novel method of separating components of a solution of which the components have different evaporative characteristics, such that one of the components may be evaporated into a vapor or the like, and another of the components may remain in a liquid state or condition for independent treatment thereof.

In usual refrigeration, there is essentially an evaporation of a fluid refrigerant for the absorption of heat. The refrigerant is usually a volatile liquid contained in an evaporator, and evaporation or ebullition is effected by mechanical exhaustion or chemical absorption. The former is known as the "pressure" type of refrigeration and the latter as the "absorption" type. The present invention relates to the pressure type. In such a type, is included means for converting the vapors into liquid state for re-use in the evaporator. The converting means comprises a pump frequently referred to as a compressor and a cooling means often termed a condenser.

The refrigerant usually used is sulphur dioxide but this substance has several disadvantages. It is corrosive, poisonous, and has an obnoxious odor. In the presence of moisture or water, this substance forms an acid which attacks and corrodes the parts of the refrigerating device, causing leakage of the refrigerant and escape of its fumes. It is only slightly miscible with oil, so that the oil used in the system for lubricating purposes forms a stratum on the surface of the liquid refrigerant in the evaporator, thus reducing the evaporative effect thereof. Entry of air in the system also reduces the refrigerating efficiency of the system. When air is mixed with the vapors of some refrigerants, an explosive mixture is produced and explosions of refrigerating devices from this cause have occurred. To remove the air, it is necessary to call a service man to service the device. The same is true when water is present in the system. The purging and recharging of such a system requires considerable skill, time and effort, and is dangerous. Ammonia as a refrigerant, from a mechanical standpoint, is less desirable than sulphur dioxide. Methyl and ethyl chlorides have been used but they are poisonous, inflammable and slightly explosive, among other disadvantages, and are very undesirable.

The present invention comprehends the use of a refrigerant which avoids all of the disadvantages mentioned, and a novel device or system especially adapted for using such refrigerant. The refrigerant preferably used in connection with our system, is dichloromethane, now obtainable in substantially pure state. It has the chemical formula $CH_2Cl_2$. It is non-inflammable, non-explosive, non-corrosive (with or without presence of moisture) of most metals used in refrigerating devices, non-poisonous and readily extinguishes fire, in both its liquid and gaseous or vaporous forms. At atmospheric pressure, it has a boiling point of about 105° F. and is therefore a liquid at all normal temperatures. Its density is about 1.33. Being a liquid, it is easily handled and can be simply poured at any point desired into the refrigerating system to charge it. It does not give off objectionable fumes. Its vapor has a very slight and inoffensive odor. The vapor has a higher specific gravity (about 3.0) than air, and sinks in air.

This refrigerant used in the present invention, is used at a low pressure, this is very advantageous because it avoids any rupture in the system, and reduces leakage to a minimum. At an absolute pressure of 3.2″ Hg, its boiling point is 14° F. The pressure differential of the pump in the system used in connection with my invention, is about or less than one atmosphere, and the head pressure at the pump outlet is about atmospheric. The refrigerant has a greater thermal efficiency than any other known practical refrigerant. Its co-efficient of performance is 5.14 and is only 0.6 below the theoretical maximum. It requires less horse power per ton of refrigeration produced than any other known refrigerant. The terms "ton of refrigeration" means the amount of refrigeration effected when melting a ton of ice. Its factor is 0.918 as against the theoretical factor of 0.821. It is miscible with oil and hence no stratum of oil can be formed on the refrigerant in the evaporator to strangle or choke the evaporation of the liquid refrigerant. The refrigerant, in the system used in connection with the present invention, may contain dissolved oil to the extent of 25% and the practical operativeness of the system occurs without decreasing the efficiency of the system. Even when the content of the evaporator is half oil, the efficiency of evaporation is but slightly affected. In other words, if it were possible, but not at all probable under ordinary conditions, to dissolve sufficient oil as to constitute a large portion of the content of the system, the refrigerant still has the property of evaporating to the extent of producing a substantial exchange of heat, not materially different from the action of the refrigerant when it has practically no oil dissolved in it.

It is an object of the present invention to provide means for and a process of removing the oil from the mixture or solution of the oil and refrigerant liquid, at such a rate that the percentage of oil in the liquid in the evaporator may be maintained below a given amount.

Another object of the invention is to provide a novel means whereby a portion of the liquid in the evaporator may be made to move in an attenuated or thin stream or film and subjecting such stream to such temperature and pressure as to cause an evaporating of the refrigerant liquid component but leaving the oil in liquid state, and returning such oil in such state to the body of oil in the chamber of the pump of the system.

Another object of the invention is to provide a novel process for causing a flow of an attenuated or thin stream of the liquid in the evaporator in a tortuous and long path or channel and subjecting such stream to such pressure and temperature as to cause the evaporation of the liquid refrigerant component and leaving the oil component in liquid state so that it may be returned to the body of the oil in the casing containing the oil for the pump.

Other objects, advantages, capabilities, features, and process steps are comprehended by the invention as will later appear and as are inherently possessed by the invention.

Referring to the drawings;

Fig. 1 is a diagrammatic or schematic view of a refrigerating system comprehending the invention;

Fig. 2 is a longitudinal sectional view through an evaporating chamber and separating means constructed in accordance with the invention;

Fig. 3 is a top plan view of part of the separating means;

Figs. 4, 5, 6, 7 and 8 are transverse sectional views taken in planes represented by lines 4—4, 5—5, 6—6, 7—7 and 8—8 in Fig. 2 of the drawings;

Fig. 9 is a longitudinal sectional view taken through an alternate form of the invention;

Fig. 10 is a top plan view of a part of the separating means;

Figs. 11 and 12 are transverse sectional views taken in planes represented by lines 11—11 and 12—12 in Fig. 9 of the drawings;

Fig. 13 is a top plan view of the guard means secured to the bottom of the plate 72 shown in Figs. 9 and 10 of the drawings; and, Fig. 14 is a sectional view on an enlarged scale of the feeding means for the form of device shown in Figs. 9-13 inclusive.

Referring more in detail to the drawings, the embodiments selected to illustrate the invention, are shown in a refrigerating system which is in the form of a closed circuit or circuitous passage containing a given quantity of refrigerant, preferably dichloromethane, or such other refrigerant as ethyl chloride, methyl chloride, ethylene chloride, trichloro-ethylene, carbon tetrachloride, methyl formate, and the like, having physical characteristics and properties similar to or like those of dichloromethane.

The circuit (see Fig. 1) comprises an evaporator 1, a pump 2, a condenser 3, and a trap 4, together with connecting ducts. The pump is operated by a motor 5 through a shaft 6 carrying at its end a fan 7 for causing a flow of air through the condenser to cool it. From the evaporator 1 leads a duct 8 for conveying the vapors to the pump, this duct including a flexible or yieldable section or segment 9 of sylphon or bellows type to absorb and prevent transmission of vibrations and sound from the operating parts of the system to the remainder thereof, and also includes a check valve 10 which in practice is connected at the inlet to the pump but on the drawings is shown conventionally remote therefrom for the sake of clarity. From the pump leads a duct 11 for conveying compressed vapors to the condenser 3, the latter comprising a serpentine coil 12 carrying a group of heat absorbing or cooling fins 13. From the condenser leads a duct 14 for conducting the condensed refrigerant to the trap 4. The trap 4 comprises a chamber of sufficient capacity to contain all of the liquid refrigerant charged into the system, and it also includes in the chamber a float (not shown) connected to a valve operative in a valve device 15 at the bottom of the trap for the purpose of controlling the flow and return of the liquid refrigerant by way of a duct 16 to the evaporator 1. The evaporator comprises an evaporating chamber or drum 17 to the lower part of which are connected a group of circulating tubes 18 surrounding and embracing a freezing compartment or zone 19 containing shelves 20 or the like for holding ice trays or the like, the tubes 18 and the chamber 17 forming a circuit in which the liquid refrigerant 21 circulates during the evaporating function of the system. At one side of the evaporator is connected a chamber 22 which is common to and in communication with all the tubes 18. To this chamber 22 is connected the return duct 16, so that the liquid refrigerant flowing into the chamber 22 may be distributed equally to the tubes 18, and also be induced to circulate in the circuit of the tubes 18 and the chamber 17. The upper ends 23 of the tubes 18 project for a short distance within, and above the bottom of the chamber 17, the ends 23 being fitted into inwardly directed lips or flanges 24 surrounding the apertures provided for the reception of tubes 18, as clearly shown in Figs. 2, 4, 5, 6, 9, 11 and 12.

The chamber 17 is elongated and of cylindrical shape and has an end wall 25 and a closure plate 26 at the other end thereof, the plate 26 being held in sealed condition at its border 27 by spun portions 28 and 29 of the end of the chamber 17. The closure plate or cap 26 is provided with a suitable passage 30 having a neck 31 connected by way of a fitting or coupling 32 to the duct 8 leading to the pump 2. The passage 30 also has an inwardly directed neck 33 to which is connected the outlet end of a vapor duct 34 (Fig. 2) or 35 (Fig. 9), such duct extending toward the other end of the chamber 17 and having vapor inlet 36 (Fig. 2) or 37 (Fig. 9), the inlet 36 being funnel shaped and the inlet 37 being biased so that in both cases these inlets readily catch the oil drip from the separating devices located above them and which are described below. In both cases, the inlets 36 and 37 are located at a higher level than the outlets or passages 30 leading to the duct 8, the outlet 34 having a bend 38 for the accumulation of oil separated from the solution in the chamber 17 and located at a lower level than the outlet of the duct 34, while the duct 35 inclines downwardly from its inlet to its outlet, as shown in Fig. 9. Duct 34 also has, at a given height, a small opening or aperture 39 such that should the level of the liquid refrigerant 21 rise too high, some of the liquid will flow into the duct 34 through the aperture 39 and be carried back to the pump.

The invention comprehends a device for separating components of the solution of refrigerant and oil by subjecting the solution in the form of a film or the like to such pressure as to cause the refrigerant component to vaporize and to leave the oil component in liquid state.

One form of device is shown in Figs. 2 to 8, and comprises an inclined plate or apron 40 having curved side flanges 41 and 42 in sealing engagement with the curved side walls of the chamber 17 so as to leave a segment shaped space above the plate 40, and having upwardly extended segment shaped flanges 43 and 44 at the ends of the plate 40, the upper edges of these flanges having sealing engagement with the top wall of the chamber 17. If desired, these upper edges of the flanges 43 and 44, may have tongues 45 (Fig. 2) fitted into suitable apertures formed in the top wall of the chamber 17.

At the upper end of the plate 40 is provided any number of elongated apertures or slots 46 and alternating strips or bars 47 so curved in cross section as to form longitudinal troughs 48 in the upper surfaces of the strips, these troughs being for the purpose of catching drops or particles of solution sprayed or splashed up in the chamber 17 and through the "pick-up" slots 46, when the solution is undergoing a boiling or ebullition.

Just beyond the lower end of the "pick-up" troughs 48 is located a baffle plate 48ª suitably secured to the top of the chamber 17 and having its lower edge 49 at a suitable distance above the plate or apron 40 to provide a passage or throat 50 for the movement of a stratum or film of the solution from the troughs 48 over the plate portion or part 51.

At a suitable distance beyond the lower ends of the troughs 48 are provided in the part 51, a number of over-flow holes 52 through which excess liquid or solution may pass to be returned to the body of solution in the chamber 17, and between which (holes 52) are provided bridges 53 for the movement thereover of the stratum or film of solution to the part 51ª of the apron 40. At a short distance beyond the holes 52, the plate part 51ª is formed with depressed portions to form drip ribs 54 on the underside of the plate 40, so that any liquid adhering or clinging to the underside of the plate part 51ª, will be caused to drip or drop from the ribs 54 and be returned to the body of liquid in the chamber 17, the ribs 54 acting as barriers against the movement of a film of liquid along the under surface of the plate 40.

Beyond the ribs 54, the plate 40 is provided with a number of upwardly pressed cross ribs or barriers 55, 56 and 57 arranged in staggered and alternating relations so as to provide among them tortuous paths or channels 58 and 59 for the flow or movement of the liquid in tortuous and long paths before reaching the lower portion 60 of the apron 40. Longitudinally along the center of the plate 40 may be provided a rib or the like 61 adapted to divide the channels in groups but this rib 61 may be omitted if desired. The part 60 is also provided with ribs 62 and 63 which converge and are united below a hole or outlet 64 through which the liquid may pass and drop into the inlet 36 of the duct 34, the ribs 62 and 63 acting as walls or dikes to prevent the liquid passing beyond the hole 64 and upon the lower part 65 of the plate 40.

Beneath the plate 40 is provided a guard plate 66 the side edges 67 and 68 of which may be either in contact with or slightly spaced from the side walls of the chamber 17, the plate 66 being at a greater inclination than the plate 40. At its upper end, plate 66 has a flange 69 engaged with the underside of the plate part 51, and at its lower end has an upwardly extending end wall 70 engaged with the end wall 43 of the plate 40. See Fig. 2. Near its lower end the plate 66 is provided with a hole or opening 71 of ample size to permit the projecting therethrough of the inlet end of the duct 34 and the passage therethrough of vapors and the like from the space above the liquid in the chamber 17 to the inlet 36 of the duct 34, and also for such communication that the pressure (sub-atmospheric) may be the same above the plate 66 as beneath it.

In the form of device shown in Figs. 9-14, is provided an inclined plate or apron 72 having curved side flanges 73 and 74 fitting against the curved side walls of the chamber 17 (Fig. 11) and having suitable projections 75 and 76 fitting into depressions 77 and 78 suitably formed in the side walls of the chamber 17 (Fig. 11). The top of plate 72 is provided at its edges and ends with upwardly extending ribs or the like 79, 80, 81 and 82 which act as walls or dikes to prevent the spilling over of the liquid on the plate or apron 72. At the upper end of the plate 72, the plate portion 83 is provided with a number of holes 84 surrounded by upwardly extending lips 85 and among these are troughs or the like 86 for the receiving and catching of drops and particles of liquid sprayed or splashed upwardly through the holes 84 from the liquid undergoing boiling or ebullition in the chamber 17.

At a suitable distance beyond the plate part 83 are provided a number of holes 87 in plate part 88 of the apron of plate 72. These holes are so spaced as to provide bridge portions 89 between the holes, over which the liquid film or stratum may move. The holes are for the dropping therethrough of excess liquid which may be returned to the body of liquid in the chamber 17.

Between the holes 84 and 87 is provided a feed device comprising a plate 90 extending across the plate part 91 and having inclined end portions 92 and 93 disposed parallel to the inclined walls of the neighboring ribs or ridges 80 and 79. (Fig. 11). The plate 90 is secured in spaced relation with the plate part 91 by means of rivets 94 and 95 or the like and spacing washers 96 and 97 or the like, thus providing a thin feeding passage or channel 98, the inclined end portions 92 and 93 also being so spaced from the walls of the side ridges 80 and 79 to also provide extensions 99 and 100 to the feeding passage or channel 98. This channel is of such magnitude as to permit the feed therethrough of a film of liquid of given thickness, the channel being in the nature of a "fountain pen" feed. The film of liquid by reason of the adhesion of the liquid to the parts of the feed device, or surface tension of the liquid, or capillary attraction, and by means of the gravitational force acting on the liquid in accordance with the inclination of the plate 72, will move at a given rate which may be determined for the desired effect of the separator, such as for completely evaporating the refrigerant component of the solution passing over the surface of the plate 72. The rate may be regulated by adjusting the size of the channel 98 as by using spacers 96 and 97 of different thicknesses. To prevent an overflow of liquid from the plate part 83, over the top of the feeding device, the plate 90 is provided with a plate 101 to act as a barrier or dam.

Beyond the plate part 88, is provided depressed portions 102 and 103 which form drip ribs on the underside of the plate 72 such that any liquid clinging or adhering to the under surface of the part 88, will be made to drip or drop from these ribs for return to the body of liquid in the chamber 17, and will not move as a film along the under surface of the plate 72.

Beyond the ribs 102 and 103, the plate 72 is formed with a number of upwardly pressed ribs or barriers 104 and 105 which are arranged in staggered or alternating relation so as to provide a tortuous and long path or channel 106 for the movement of the film or stratum of liquid over the surface of the plate 72. Longitudinally of the plate 72 may be provided a dividing rib 105ª so as to divide the ribs or barriers 104 and 105 into groups, but this dividing rib may be omitted if desired. At the lower end of the plate 72 is provided an opening 206 in a depressed part 107 of the plate 72, the depression 107 being bound by barriers or ribs 108, 109 and 110 for directing the liquid (oil) into the hole 206. The hole 206 is located directly above the receiving end 37 of the duct 35 so as to receive the oil dripping or dropping through the hole 106.

Beneath the plate 72 is secured a guard plate 111 having a flange 112 secured to the under part of the plate part or portion 91 by the rivets or the like 94 and 95, and having an inclined portion running to a trough 113 having side flanges or walls 114 and 115 (Fig. 12) engaging the side walls of the chamber 17, and the trough having an opening or aperture 116 for the flow therethrough of liquid, the trough 113 also having an end wall 117 and a flange 118 secured to the lower end of the plate 72 by any suitable means, such as rivets 119. The other end of trough 113 has a wall 113ª connected with the lower end of guard 111, and has holes 113ᵇ through one of which extends the duct 35 and through the others communication is established between the interior of the trough 113 and the chamber 17.

The guard plate 111 may be, if desired, at a greater inclination than the plate 72.

In operation, the liquid or solution of oil and refrigerant undergoing a boiling or ebullition in the chamber 17, will be so agitated as to spray or splash upwardly through the holes 46 or 84 and fall upon the plate portion or part 48 or 83 where the liquid starts to flow downwardly over the plate 40 or 72, as the case might be. If there be too much liquid, some of it will drop through the holes 52 or 87 for return to the body of liquid in the chamber 17. The remainder of the liquid flows over the bridges 53 or 89 and thence by way of the long and tortuous paths or channels 58 or 106 whereby the film of liquid is subjected to the sub-atmospheric pressure in the chamber 17 and thus the refrigerant component of the solution evaporates and is converted into a vapor, and the oil component remains in liquid form or state and flows to the lower end of the apron or plate 46 or 72 for delivery as liquid drops or the like by way of the discharge openings 64 or 106 and into the inlet ends 36 or 37 of the ducts 34 or 35 leading to the pump 2 of the system. At the same time, the vapors arising from the boiling liquid in the chamber 17, and produced from the liquid flowing in a film over the aprons or plates 40 or 72, also pass into the ducts 34 or 35 to be conducted to the pump 2 and be compressed or the like thereby.

Referring to Fig. 14, should the liquid accumulate too rapidly, its excess may drop, as shown by drop 120, through the holes 84 and be returned to the body of liquid in the chamber 17. Likewise, if the feed of the liquid through the feed device or "fountain pen" feed be too rapid, the excess liquid will drop, as by drops 121, through the openings 87 and be conducted to the body of liquid in the chamber 17, by flowing over the guard plate 111. The object is to permit a film 122 of proper amount and thickness to flow over the plate 72 such that all of the refrigerant component thereof may be evaporated by the time the liquid reaches the hole 206 so that only oil will drop through the hole 206. The same is true of the form shown in Figs. 2 to 8, inclusive, whereby excess of liquid drops through the holes 52, and only such a film of proper amount and thickness flows along the tortuous paths or channels 58 as will permit the refrigerant component to evaporate and leave only the oil component to drop through the hole 64 into the duct 34, and be conducted by way of the inclined guard plate 66 into the chamber 17.

The guards 66 or 111 are to prevent the separation of the oil and refrigerant components on the under sides of the plates or aprons 40 or 72. If any of the liquid should cling or adhere to the under sides of the plates 40 or 72, the liquid will drip from the ribs 54 or 103 and will flow back down the inclined plate 66 or 111 to reunite with the body of the liquid in the chamber 17. On the other hand, if this were not the case, a film might be formed along the whole length of the under surface of the plates 40 or 72, and the components of this liquid would be separated the same as upon the top of the plates 40 or 72. This would be a waste of heat, because the oil component would not be properly conducted back into the duct leading to the pump. By providing the guard plates 66 or 111, and the ribs 54 or 103 this is prevented so that the total exchange of heat will be efficiently utilized in separating the components upon the top of the plates 40 or 72. In this way all the heat exchange occurs on the upper surfaces of the plates 40 or 72 for efficient evaporation of the refrigerant component thereon and leaving the oil component in liquid state for flow to the discharge outlets 64 or 206 as the case may be.

By the means disclosed, the oil content in the solution in the chamber 17 may be maintained at a low percentage, such as 1% of the solution in the chamber 17.

The oil component will drop into the duct 34 or 35 and may flow along the same to be returned to the pump 2 by way of the duct 8, etc., or may accumulate in the bend 38 to such an extent that it may be forced as in the form of a slug of oil to the duct 8 for return to the pump 2. In both cases, the oil returns in liquid form and the refrigerant returns in vaporous or gaseous form to the pump 2.

While we have herein described and upon the drawings shown a few embodiments of the invention and a mode of utilizing the same, it is to be understood that the invention is not limited thereto but comprehends other constructions, arrangements of parts, details, features and process steps without departing from the spirit thereof.

Having thus disclosed the invention, we claim:

1. A device for separating components of a solution the components of which have different evaporative characteristics, comprising a member having an inclined surface over which may move a film of the solution, an upper portion of said surface having an opening through which said solution may be cast to be received upon the surface portion about said opening, and a lower portion thereof having means for discharging a separated component of the solution and means for subjecting the solution on said surface to such pressure and temperature as to effect an evaporation of a component of the solution and to leave another component of the solution in liquid state.

2. A device for separating components of a solution the components of which have different evaporative characteristics, comprising a member having an inclined surface over which may move a film of the solution, an upper portion of said surface having openings and receiving troughs between the openings for receiving solution cast up through said openings, and a lower portion thereof having means for discharging a separated component of the solution, and means for subjecting the solution on said surface to such pressure and temperature as to effect an evaporation of a component of the solution and to leave another component of the solution in liquid state.

3. A device for separating components of a solution the components of which have different evaporative characteristics, comprising a member having an inclined surface over which may move a film of the solution, an upper portion of said surface having means for receiving the solution, a lower portion thereof having means for discharging a separated component of the solution, means near said receiving means for overflow of excess of solution, and means for subjecting the solution on said surface to such pressure and temperature as to effect an evaporation of a component of the solution and to leave another component of the solution in liquid state.

4. A device for separating components of a solution the components of which have different evaporative characteristics, comprising a member having an inclined surface over which may move a film of the solution, an upper portion of said surface having means for receiving the solution, a lower portion thereof having means for discharging a separated component of the solution, means near said receiving means for controlling the feed of the solution over said surface, means near said receiving means for overflow of excess of solution, and means for subjecting the solution on said surface to such pressure and temperature as to effect an evaporation of a component of the solution and to leave another component of the solution in liquid state.

5. A device for separating solution components having different evaporative characteristics, comprising a member having an inclined surface over which the solution may flow in an attenuated stream, a portion of the surface of said member having barriers so positioned as to provide a tortuous path for said stream, an upper portion of said member having openings through which the solution may be cast up to be received upon the surface of said upper portion between said openings, a lower portion of said member having a discharge outlet for a separated component of the solution, and means for subjecting said stream to such pressure and temperature as to cause a component to evaporate and to leave another component in liquid state for discharge through said outlet.

6. A device for separating solution components having different evaporative characteristics, comprising a member having an inclined surface over which the solution may flow in an attenuated stream, a portion of the surface of said member having barriers so positioned as to provide a tortuous path for said stream, an upper portion of said member having openings through which the solution may be cast up to be received upon the surface of said upper portion between said openings, said surface portions between said openings having upwardly extending parts between which are provided receiving troughs for the cast up solution, a lower portion of said member having a discharge outlet for a separated component of the solution, and means for subjecting said stream to such pressure and temperature as to cause a component to evaporate and to leave another component in liquid state for discharge through said outlet.

7. A device for separating solution components having different evaporative characteristics, comprising a member having an inclined surface over which the solution may flow in an attenuated stream, a portion of the surface of said member having barriers so positioned as to provide a tortuous path for said stream, an upper portion of said member having openings through which the solution may be cast up to be received upon the surface of said upper portion between said openings, said surface portions between said openings having upwardly extending parts between which are provided receiving troughs for the cast up solution, feed means for controlling the flow of the solution for the receiving troughs, a lower portion of said member having a discharge outlet for a separated component of the solution, and means for subjecting said stream to such pressure and temperature as to cause a component to evaporate and to leave another component in liquid state for discharge through said outlet.

8. A device for separating solution components having different evaporative characteristics, comprising a member having an inclined surface over which the solution may flow in an attenuated stream, a portion of the surface of said member having barriers so positioned as to provide a tortuous path for said stream, an upper portion of said member having openings through which the solution may be cast up to be received upon the surface of said upper portion between said openings, said surface portions between said openings having upwardly extending parts between which are provided receiving troughs for the cast up solution, over-flow means for discharging excess solution, feed means for controlling the flow of the solution from the troughs to the over-flow means, a lower portion of the said member having a discharge outlet for a separated component of the solution, and means for subjecting said stream to such pressure and temperature as to cause a component to evaporate and to leave another component in liquid state for discharge through said outlet.

9. A device for separating solution components having different evaporative characteristics, comprising a member having an inclined surface over which the solution may flow in an attenuated stream, a portion of the surface of said member having barriers so positioned as to provide a tortuous path for said stream, an upper portion of said member having openings through which the solution may be cast up to be received upon the surface of said upper portion between said openings, a portion of said member near said receiving surface having openings for the passage therethrough of excess solution, a guard beneath said member for preventing adherence of cast up solution to the under surface of said member, a lower portion of said member having a discharge outlet for a separated component of the solution, and means for subjecting said stream to such pressure and temperature as to cause a component to evaporate and to leave another component in liquid state for discharge through said outlet.

10. In a refrigerating system comprising an evaporating means having an evaporating chamber containing a liquid refrigerant including oil in solution, a separating device in said chamber and comprising a member having an inclined surface over which liquid refrigerant with oil in solution may flow in an attenuated stream, said member having means at the higher end of the inclined surface for receiving liquid refrigerant with oil in solution splashed or sprayed up from the body of liquid undergoing a boiling or ebullition in said chamber and for feeding the same to said inclined surface portion of said member, means for conducting away the oil separated from the liquid on said inclined surface, and means for subjecting the liquid on said inclined surface to such a pressure and temperature as to cause an evaporation of the refrigerant component of said liquid and to leave the oil component in liquid state.

11. In a refrigerating system comprising an evaporating means having an evaporating chamber containing a liquid refrigerant including oil in solution, a separating device in said chamber and comprising a member having an inclined surface over which liquid refrigerant with oil in solution may flow in an attenuated stream, said member having means at the higher end of the inclined surface for receiving liquid refrigerant with oil in solution splashed or sprayed up from the body of liquid undergoing a boiling or ebullition in said chamber and for feeding the same to said inclined surface portion of said member, said member having an outlet means at the lower end of said surface for discharging oil separated from the liquid on said inclined surface, a duct for conducting away the vapors from said chamber and having its inlet beneath said outlet for receiving said oil, and means for subjecting the liquid on said inclined surface to such a pressure and temperature as to cause an evaporation of the refrigerant component of said liquid and to leave the oil component in liquid state.

12. In a refrigerating system comprising an evaporating means having an evaporating chamber containing a liquid refrigerant including oil in solution, a separating device in said chamber and comprising a member having an inclined surface over which liquid refrigerant with oil in solution may flow in an attenuated stream, said member having means at the higher end of the inclined surface for receiving liquid refrigerant with oil in solution splashed or sprayed up from the body of liquid undergoing a boiling or ebullition in said chamber and for feeding the same to said inclined surface portion of said member, said member having an outlet means at the lower end of said surface for discharging oil separated from the liquid on said inclined surface, said surface having near said receiving means openings for the discharge of excess liquid flowing to said inclined surface and the returning of the excess liquid to the body of liquid in said chamber, a duct for conducting away the vapors from said chamber and having its inlet beneath said outlet for receiving said oil, and means for subjecting the liquid on said inclined surface to such a pressure and temperature as to cause an evaporation of the refrigerant component of said liquid and to leave the oil component in liquid state.

13. In a refrigerating system comprising an evaporating means having an evaporating chamber containing a liquid refrigerant including oil in solution, a separating device in said chamber and comprising a member having an inclined surface over which liquid refrigerant with oil in solution may flow in an attenuated stream, said member having means at the higher end of the inclined surface for receiving liquid refrigerant with oil in solution splashed or sprayed up from the body of liquid undergoing a boiling or ebullition in said chamber and for feeding the same to said inclined surface portion of said member, said member having an outlet means at the lower end of said surface for discharging oil separated from the liquid on said inclined surface, means for controlling the feed of the liquid from said receiving means to said inclined surface, a duct for conducting away the vapors from said chamber and having its inlet beneath said outlet for receiving said oil, and means for subjecting the liquid on said inclined surface to such a pressure and temperature as to cause an evaporation of the refrigerant component of said liquid and to leave the oil component in liquid state.

14. In a refrigerating system comprising an evaporating means having an evaporating chamber containing a liquid refrigerant including oil in solution, a separating device in said chamber and comprising a member having an inclined surface over which liquid refrigerant with oil in solution may flow in an attenuated stream, said member having means at the higher end of the inclined surface for receiving liquid refrigerant with oil in solution splashed or sprayed up from the body of liquid undergoing a boiling or ebullition in said chamber and for feeding the same to said inclined surface portion of said member, said member having an outlet means at the lower end of said surface for discharging oil separated from the liquid on said inclined surface, means for controlling the feed of the liquid from said receiving means to said inclined surface, said surface having near said receiving means openings for the discharge therethrough of excess liquid flowing to said inclined surface and the returning of the excess liquid to the body of liquid in said chamber, a duct for conducting away the vapors from said chamber and having its inlet beneath said outlet for receiving said oil, and means for subjecting the liquid on said inclined surface to such a pressure and temperature as to cause an evaporation of the refrigerant component of said liquid and to leave the oil component in liquid state.

15. In a refrigerating system comprising an evaporating means having an evaporating chamber containing a liquid refrigerant including oil in solution, a separating device in said chamber and comprising a member having an inclined surface over which liquid refrigerant with oil in solution may flow in an attenuated stream, said member having means at the higher end of the inclined surface for receiving liquid refrigerant with oil in solution splashed or sprayed up from the body of liquid undergoing a boiling or ebullition in said chamber and for feeding the same to said inclined surface portion of said member, said member having an outlet means at the lower end of said surface for discharging oil separated from the liquid on said inclined surface, said surface having near said receiving means openings for the discharge therethrough of excess liquid flowing to said inclined surface and the returning of the excess liquid to the body of liquid in said chamber, an inclined guard beneath said member for preventing the adhering of liquid sprayed or splashed up from the liquid in said chamber to the under surface of said member and being located to receive the excess liquid discharged through said openings and for conducting the discharged excess liquid back to the body of liquid in said chamber, a duct for conducting away the vapors from said chamber and having its inlet beneath said outlet for receiving said oil, and means for subjecting the liquid on said inclined surface to such a pressure and temperature as to cause an evaporation of the refrigerant component of said liquid and to leave the oil component in liquid state.

MAHLON W. KENNEY.
JAMES D. JORDAN.
HOWARD M. THRELKELD.